US005252112A

United States Patent [19]

Shibaoka et al.

[11] Patent Number: 5,252,112

[45] Date of Patent: Oct. 12, 1993

[54] METHOD OF PRODUCING A GLASS FRONT-PANEL PROTECTED FROM COLORING BY ELECTRON RAYS

[75] Inventors: Kazuo Shibaoka, Itami; Toshio Akimoto, Yokkaichi; Kouichi Suzuki, Nishinomiya, all of Japan

[73] Assignee: Nippon Sheet Glass Co., Ltd., Osaka, Japan

[21] Appl. No.: 870,615

[22] Filed: Apr. 16, 1992

Related U.S. Application Data

[62] Division of Ser. No. 757,340, Sep. 10, 1991.

[30] Foreign Application Priority Data

Sep. 13, 1990 [JP] Japan .................................. 2-243425

[51] Int. Cl.[5] ................................ C03C 21/00

[52] U.S. Cl. ................................ 65/30.13; 65/31; 65/61; 65/106

[58] Field of Search .................. 65/30.1, 30.13, 30.14, 65/31, 61, 106; 313/477 R

[56] References Cited

U.S. PATENT DOCUMENTS

| | | | |
|---|---|---|---|
| 3,843,472 | 10/1974 | Toussaint et al. | 65/31 |
| 5,057,134 | 10/1991 | Suzuki et al. | 65/30.13 |

FOREIGN PATENT DOCUMENTS

| | | |
|---|---|---|
| 2714423 | 10/1977 | Fed. Rep. of Germany . |
| 57-88641 | 6/1982 | Japan . |
| 2200627A | 8/1988 | United Kingdom . |

*Primary Examiner*—Joye L. Woodard

*Attorney, Agent, or Firm*—Woodcock Washburn Kurtz Mackiewicz & Norris

[57] ABSTRACT

In a glass front-panel for a cathode ray tube, whose surface layer contains more potassium ions than those in the interior thereof, and whose flange is stuck to a rear panel to form a vacuum vessel, only the surface layer of the flange portion is substantially removed, or in a glass front-panel for a cathode ray tube, comprising an image displaying portion, a side wall portion and a flange portion, a belt-like electrode for making a gradient of electric potential easier is disposed on a surface of the side wall portion, so that the cathode ray tube is prevented from being damaged due to dielectric breakdown.

5 Claims, 4 Drawing Sheets

METHOD OF PRODUCING A GLASS FRONT-PANEL PROTECTED FROM COLORING BY ELECTRON RAYS

This is a division of application Ser. No. 757,340, filed Sep. 10, 1991.

BACKGROUND OF THE INVENTION

1. Field of the Invention

This invention relates generally to a cathode ray tube for an electronic display, on which a pictorial image is produced, and more particularly is directed to a glass front-panel for a cathode ray tube, which is available for a thin-image display apparatus.

2. Description of the Related Art

As a thin image-display apparatus, an apparatus displaying an image by means of a matrix drive system is known, for example, as disclosed in Journal of the Society of Television Engineers, Vol. 40, No. 10.1024 (1986). A glass front-panel for a cathode ray tube available for an image display apparatus comprises an image displaying portion with a flat surface, a side wall portion contiguous to the image displaying portion, and a flange portion crookedly contiguous to the side wall portion, for example, as disclosed in Japanese Laid-open Patent Publication No. 62-153148. The glass front-panel is stuck, with glass frit or the like, to a rear panel made of, for example, a metal plate to form a vacuum vessel.

In such image display apparatus, an electron beam is emitted by an electron gun unit comprising a group of electron-beam-controlling electrodes with a matrix array, and irradiates a phosphor provided on the inner surface of the image displaying portion of the glass front-panel to display an image. To impress the voltage of an electric source to the electron gun unit, a line connecting the electron gun unit to an external terminal is provided. The line passes, for example, through a joint portion, that is, the glass frit lying between the glass front-panel and the rear panel.

However, during the image displaying, a high voltage of several kV or more is generated between the image displaying portion of the glass front-panel and the external terminal having connected to the line passing through the glass frit, which lies between the front panel and the rear panel, so that an electric charge equipped on the front panel instantaneously cleared, passing through the bond layer of glass frit, and cracks are initiated in the bond layer or in the surface of the front panel.

OBJECT AND SUMMARY OF THE INVENTION

Accordingly, it is an object of the present invention to provide a glass front-panel for a cathode ray tube, which is available for an image displaying apparatus, wherein damages due to dielectric breakdown are not caused, during image displaying, in a surface of the glass front-panel or in a glass frit or the like, with which the glass front-panel and a rear panel are stuck together, no deterioration in color is undergone if the glass front-panel is exposed to an electron beam, and the mechanical strength of the glass front-panel is excellent.

Another object of this invention is to provide a production method of the glass front-panel described above.

In accordance with one aspect of this invention, in a glass front-panel for a cathode ray tube comprising: an electron gun unit for emitting an electron beam in response to an input video signal under a condition of reduced pressure; phosphor means emitting light when exposed to the electron beam from the electron gun unit; a glass front-panel having an image displaying portion, on the inside of which the phosphor means is disposed, a side wall portion contiguous to the image displaying portion, and a flange portion contiguous to the side wall portion, and having a surface layer containing more potassium ions than those in the interior thereof so as to be resistive to coloring action of the electron beam, as a result of the surface layer undergoing an ion exchanging treatment in molten salt that contains the potassium ions; a rear panel stuck to and forming a vessel together with the glass front-panel to accommodate the electron gun unit; and an external terminal electrically connected to the electron gun unit, the surface layer of the flange portion thereof is substantially removed.

The surface layer resistive to the coloring action of the electron beam according to the present invention will be obtained by means of dipping the glass front-panel, for a predetermined period of time, into a molten salt containing potassium nitrate as a main component, as disclosed in Japanese Laid-open Patent Publication Nos. 62-153148 and 1-203244 for example. As a result of the foregoing, an exchange is made between sodium ions in the surface layer and potassium ions in the molten salt. In this connection, a mol ratio of $K_2O/(K_2O+Na_2O)$ may be 0.2 or more, preferably, 0.3 to 0.6, concerning the alkaline ions in the surface layer.

Thus, at least the image displaying portion of the glass front-panel will have the surface layer containing more potassium ions than those in the interior thereof to a depth of about 15 μm, so that the surface layer is not easily blackened if irradiated by the electron beam. Further, compressive stresses are produced in the surface layer, so that the mechanical strength of the glass front-panel can be improved.

According to the present invention, the flange portion of the glass front-panel substantially has no surface layer which contains more potassium ions than those in the interior thereof. The potassium-rich surface layer may be present on the whole glass front-panel except for the flange portion, or only on the image displaying portion exposed to the electron beam.

If such a surface layer as to contain more potassium ions exists on the flange portion, the electric resistivity of the surface layer becomes greater than that of the interior of the flange portion. Hence, an electric charge tends to be imparted on the surface layer during image displaying and a dielectric breakdown occurs when the electric charge imparted on the surface layer is cleared. Such breakdown occurs more easily when local defects such as foreign substances or projections exist in the surface of the flange portion or in the glass frit. It is therefore preferable to lower the electric resistivity of the surface layer of the flange portion substantially to the same level as that of the interior thereof. When the image is displayed, the temperature of the glass front-panel rises and, hence, the electric insulation resistance of the glass front-panel decreases so much. Accordingly, the above dielectric breakdown at the time of discharging occurs more easily in such a cathode ray tube as to have high brightness.

If there is a small projection in a face of the flange portion of the glass front-panel, which is to be joined with the rear panel, or in the end face of the flange portion, which is denoted by character 1*d* in FIG. 1C, a discharge easily starts from the tip of the projection to cause the dielectric breakdown. Therefore, to prevent the dielectric breakdown at the time of image displaying, it is preferable to suppress the irregularity of the surface below 3 μm to obtain a smooth surface.

If the glass front-panel of this invention is made of glass whose electric resistivity is lower than $10^{10}$ Ω cm at temperature of 150° C., the damages due to dielectric breakdown can be considerably reduced. Such glass is, for example, soda-lime-silica glass manufactured through the float method, or well-known glass for cathode ray tube, containing BaO or alkaline earth metal oxide. Since the soda-lime-silica glass manufactured through the float method is not expensive, it is much available from the economical viewpoint.

Moreover, in the production of the glass front-panel of this invention, it is possible to use the existing method, such as press forming, in which a glass plate is heated and formed in a mold of predetermined shape, or direct forming from a glass gob.

In accordance with another aspect of this invention, in a glass front-panel for a cathode ray tube comprising: an electron gun unit for emitting an electron beam in response to an input video signal under a condition of reduced pressure; phosphor means emitting light when exposed to the electron beam from the electron gun unit; a glass front-panel having an image displaying portion, on the inside of which the phosphor means is disposed, a side wall portion contiguous to the image displaying portion, and a flange portion contiguous to the side wall portion, and having a surface layer containing more potassium ions than those in the interior thereof so as to be resistive to coloring action of the electron beam, as a result of the surface layer undergoing an ion exchanging treatment in molten salt that contains the potassium ions; a rear panel stuck to and forming a vessel together with the glass front-panel to accommodate the electron gun unit; and an external terminal electrically connected to the electron gun unit, a belt-like electrode for making a gradient of electric potential easier is provided at least on one side of the outer periphery and the inner periphery of the side wall portion.

As the material for the electrode for making the gradient of electric potential easier, semiconductor materials or a mixture of semiconductor material and conductive material can be used. As the semiconductor material, fine powder of silicon carbide, tungsten carbide, a mixture of zinc and bismuth oxide, cupric oxide, or the like may be available, and as the conductive material, fine powder of carbon, silver, copper, or the like may be available. It is preferable to mix the semiconductor material, or to mix the semiconductor material with the conductive material, in order that the electric resistivity of the mixture is adjusted within the range of $10^5$ to $10^9$ Ω cm on its dried condition. The belt-like electrode having such electric resistivity is secured to either or both of the outer and inner surfaces of the side wall portion of the glass front-panel, and thereafter, dried up. The electric resistivity lower than 105 Ω cm is undesirable because electrons emitted by the electron gun unit, which pass through a space near the side wall portion within the vessel and impinge on the phosphor on the image displaying portion, are deflected by an effect of space potential existing in the vicinity of the side wall portion, and thereby, the image produced in a circumferential portion of the image plane is distorted. Further, the electric resistivity higher than $10^9$ Ω cm is also undesirable because it becomes insufficient to make the gradient of electric potential easier.

If the electric resistivity of the belt-like electrode is kept within the range of $10^5$ to $10^9$ Ω cm, no image distortion is produced, and the cathode ray tube is prevented from being damaged due to local high-voltage discharging.

Moreover, in order to quickly clear of the electric charge on the side wall portion of the front panel, a second belt-like electrode made of a conductor may be secured to the side wall portion near the rear panel and brought into contact with the first belt-like electrode having the electric resistivity of $10^5$ to $10^9$ Ω cm. At that time, to prevent the image distortion, it is preferable to place the boundary between the second belt-like electrode and the first electrode in a position farther from the image displaying portion than the portion, nearest to the image displaying portion, of the electron gun unit.

Setting up the electrode for making the gradient of electric potential easier in the side wall portion of the front panel is achieved by applying a liquid and drying it up, the liquid being obtained as a result of having 30 to 80% by weight of the previously stated fine powder dispersed in epoxy resin or acrylic resin varnish, or in adhesive binder such as alumina sol and potassium silicate liquid.

As the electrode made of the conductor and provided in the side wall portion, a conductive paint whose electric resistivity is within a range of $10^2$ to $10^{-4}$ Ω cm can be used. A paint obtained by mixing fine powder of silver in an organic or inorganic binder may be used.

In accordance with another aspect of this invention, a production method of the previously stated two kinds of glass front-panels comprises steps of: heating a glass plate to form a glass front-panel having an image displaying portion of a predetermined shape, a side wall portion crookedly contiguous to said image displaying portion, and a flange portion crookedly contiguous to said side all portion; exchanging sodium ions in the whole surface layer of the shaped glass front-panel into potassium ions in a molten salt so as to make the surface layer contain more potassium ions than those in the interior of the shaped glass front-panel and, thereby, make the surface layer resistive to coloring action of the electron beam; and substantially removing only the surface layer of the flange portion by means of immersing the flange portion into an etching liquid containing hydrofluoric acid or into an eluate of alkaline ions containing inorganic acid.

For the method of making the whole surface layer of the glass front-panel have more potassium ions than those in the interior thereof, the methods disclosed, for example, in Japanese Laid-open Patent Publication Nos. 62-153148 and 1-203244 are available. In the surface layer of the glass front-panel, the mol ratio $K_2O/(K_2O+Na_2O)$ is set to be 0.2 or more, and preferably, 0.3 to 0.6.

As the etching liquid of acid, including hydrogen fluoride, for dissolving and then removing the surface layer of the flange portion after the whole surface of the glass front-panel is changed to such a layer as to be resistive to the coloring action of the electron beam, a solution obtained by diluting hydrogen fluoride with water can be used. Normally, the concentration of a water solution of hydrogen fluoride is set in a range of 1 to 20%. A solution containing 3 to 10% of hydrogen fluoride, or a solution obtained by adding 5 to 20% of sulfuric acid to the above solution is preferably used in view of speeding up the dissolution and removal of the surface layer, in view of reproducibility of the removed thickness of the surface layer, and in view of the surface smoothness after removing. According to composition of the glass front-panel, the water solution may contain acid such as nitric acid, hydrochloric acid, or the like. As a result of removing most of the surface layer having the high electric resistivity and resistive to the coloring action of the electron beam by the help of the water solution containing hydrogen fluoride, small flaws and projections of the surface produced in the course of the ion exchanging process can be removed. The surface becomes microscopically smooth and hardly produces abnormal discharging. Further, the electric resistivity of the surface of the glass front-panel can be brought to the same level as that in the interior thereof. As for the smoothness of the face where the flange portion is joined to the rear panel and that of the end face of the flange portion, it is desired to be under 3 μm in view of preventing the dielectric breakdown due to discharging.

As the eluate used for eluting alkaline ions included in the surface layer, that is, as the eluate for substantially removing the layer having the high electric resistivity, and reducing the resistivity of the surface layer of the glass front-panel to the same level as that of the interior thereof, a liquid containing an inorganic acid can be used. Particularly, a solution containing sulfuric acid as its main component is preferable because, when it is used, the surface of the flange portion after eluting is smooth, the process can be performed in a short time, and there is a good reproducibility. The concentration of sulfuric acid is desired to be 30% or more, and nitric acid or hydrochloric acid may be added to the sulfuric acid. Further, the etching liquid and the eluate may be heated up when used.

When the surface layer of the flange portion is removed by mechanical grinding and, then, by the above etching or eluting, it is preferable for the surface roughness of the flange portion to be under $R_{MAX}$ 8 μm after mechanical grinding.

According to the present invention, the surface layer of the glass front-panel containing more potassium ions than those in the interior thereof, and having higher electric resistivity and resistance to the coloring action of the electron beam is formed on the image displaying portion but not substantially formed on the flange portion. Accordingly, at a time of image displaying, the blackening of the image displaying portion due to bombardment of the electron beam can be suppressed. Further, the electric resistivity of the surface of the flange portion is made equal to that in the interior thereof, so that an electric charge is not imparted on the flange portion at the time of image displaying. Thus, small cracks will scarcely initiate in the joint layer, or the surface of the flange portion due to abnormal discharging accompanied by an instantaneous large current.

Moreover, the belt-like electrode provided on the side wall portion of the glass front-panel can control the electric resistivity of the side wall portion, so that no distortion is produced in the displayed image. In addition, the electric charge imparted on the surface of the front panel due to application of high voltage is prevented from being abnormally discharged along the surface of the front panel or the flange portion, as accompanied by an instantaneous large current.

In the method of producing the glass front-panel according to the present invention, the surface layer of the flange portion is dissolved and removed with the water solution of hydrogen fluoride, or from the surface layer of the flange portion, the alkaline ions that cause an increase of the electric resistivity are eluted. Thus, the surface of the flange portion is made smooth and hardly has such small projections as to cause dielectric breakdown at the time of image displaying. At the same time, the difference in the electric resistivity between the surface and the interior of the flange portion is reduced, so that the amount of electric charge imparted on the surface of the flange portion decreases.

The above, and other objects, features and advantages of this invention, will be apparent from the following detailed description of illustrative embodiments thereof to be read in connection with the accompanying drawings, wherein like reference numerals identify the same or corresponding parts in the several views.

DETAILED DESCRIPTION OF PREFERRED EMBODIMENTS

Some glass front-panels embodying the present invention and respective cathode ray tubes to which the glass front-panels are applied will be described in regard to FIGS. 1A to 4B. As shown in FIG. 1B, a glass front-panel 1 has a flat image displaying portion *1a*, a side wall portion *1b* crookedly contiguous to the image displaying portion *1a*, and a flange portion *1c* crookedly contiguous to the side wall portion. The surface layer, indicated in dotted lines, of the image displaying portion *1a* and side wall portion *1b* contains more potassium ions than those in the interior thereof, so as to be resistive to coloring action of an electron beam, and have compressive stresses for improving the mechanical strength of the glass front-panel 1. The flange portion *1c*, however, has no such surface layer. The flange portion is indicated by oblique lines in FIG. 1C.

Figure 2:
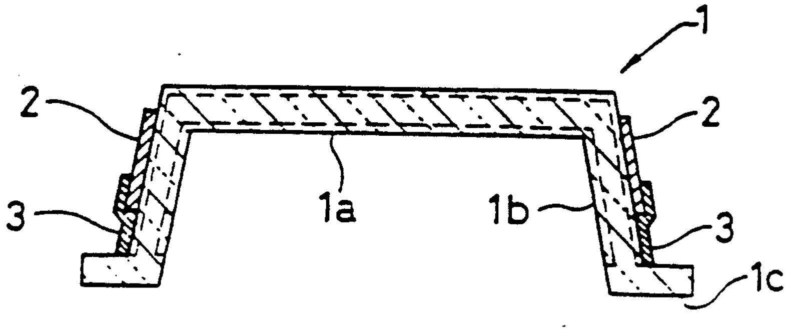
FIG. 2 is a sectional view of a glass front-panel according to a second embodiment of this invention.

In another embodiment, shown in FIG. 2, of the present invention, a belt-like electrode 2 for making a gradient of electric potential easier, and another belt-like electrode 3 made of conductive material are provided respectively on one side, near to the image display portion *1a*, of the outer surface of the side wall portion *1b* and on the other side, near to the flange portion 1*c*, of the outer surface of the side wall portion 1*b*. The two electrodes partly overlap each other.

Figure 1A:
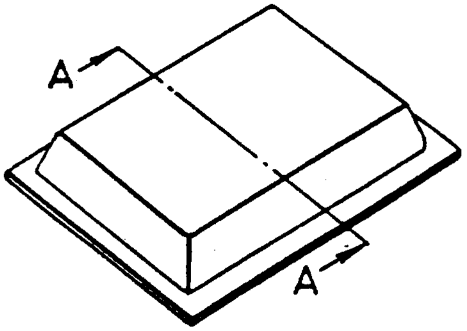
FIG. 1A is a perspective view of a glass front-panel according to an embodiment of this invention.
Figure 1B:
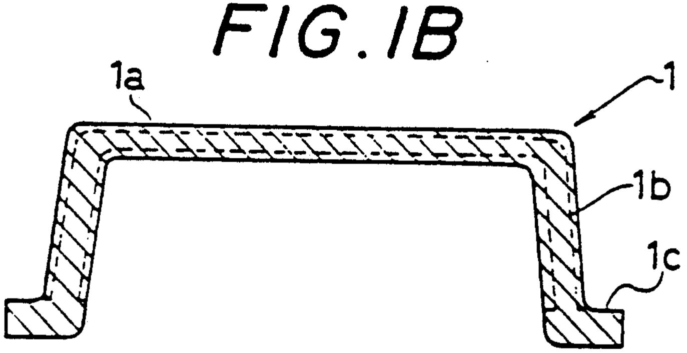
FIG. 1B is a sectional view, viewed in a direction of arrows A, of the glass front-panel of FIG. 1A.
Figure 1C:
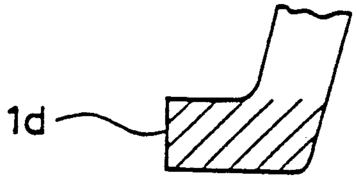
FIG. 1C is an enlarged, sectional view of a flange portion of the glass front-panel appearing on FIG. 1B.
Figure 3A:
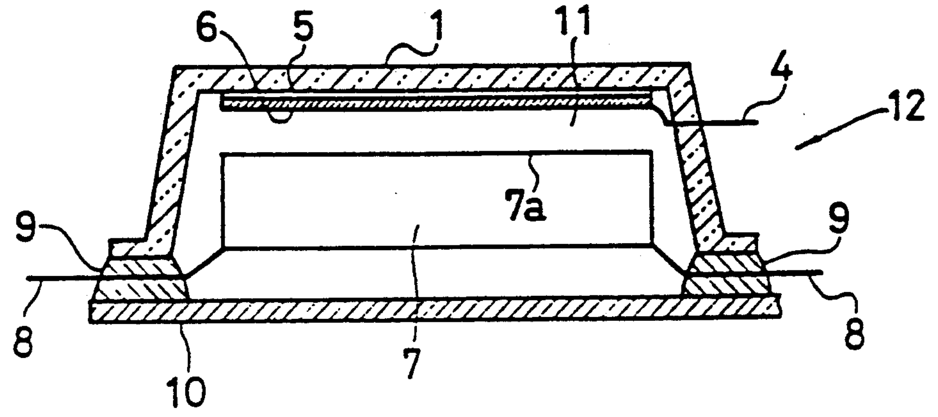
FIG. 3A is a sectional view of a cathode ray tube, to which the glass front-panel of FIG. 1B is applied.
Figure 3B:
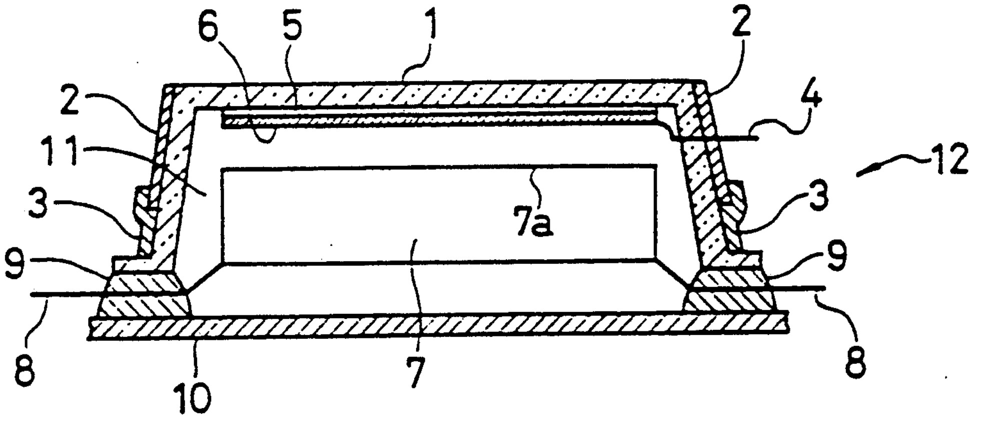
FIG. 3B is a sectional view of another cathode ray tube, to which the glass front-panel of FIG. 2 is applied.
Figure 3C:
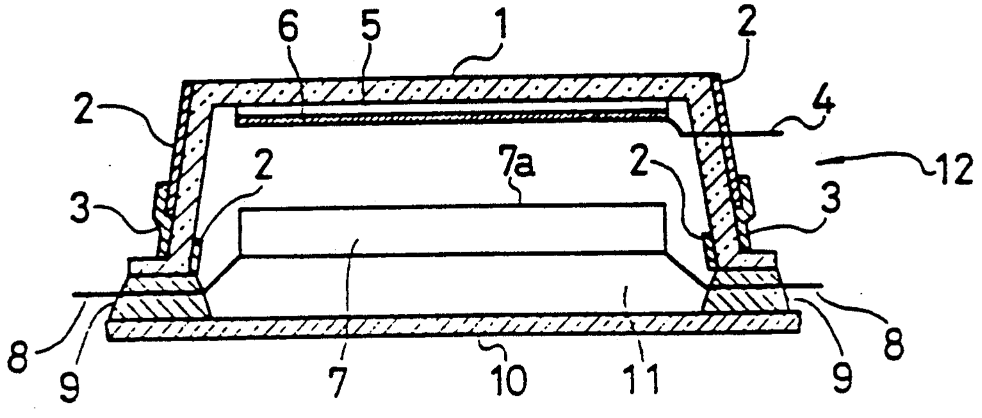
FIG. 3C is a sectional view of a modified one of the cathode ray tube of FIG. 3B.

FIGS. 3A to 3C are sectional views of some cathode ray tubes, to which the glass front-panels 1 shown in FIGS. 1A to 2 are respectively applied. As shown in FIG. 3A, a phosphor 5 is applied to the inner side of the glass front-panel 1, and covered with an aluminum foil 6, to which an external anode terminal 4 is connected. A rear panel 10 made of metal sheet is stuck to the back of the glass front-panel 1 with a glass frit 9 so as to cover the opening of the glass front-panel 1. The space 11 closed by the glass front-panel 1 and the rear panel 10 is brought to a predetermined degree of vacuum by suction. An external terminal 8 is connected to the electron gun unit 7 through the glass frit 9.

The glass front-panels 1 shown in FIGS. 1A–1C and FIG. 2 substantially correspond to respective glass front-panels applied to the cathode ray tubes 12 shown in FIGS. 3A and 3B. A modified one of the glass front-panel shown in FIG. 3B is applied to a cathode ray tube 12 shown in FIG. 3C, in which another electrode 2 for making the gradient of electric potential easier is provided on the inner surface of the side wall portion 1*b*.

It is preferable that the glass for the front-panel can be treated by ion exchange process in a molten salt containing potassium ions so that the surface layer of the front panel may be resistive to coloring due to electron beam bombardment, and compressive stresses for improving mechanical strength may be produced in the surface layer of the front panel 1.

The function of the cathode ray tube arranged as described above will be briefly described below. The electron gun unit 7 is put in action when a source voltage and television signals are impressed through the external terminal 8. The electron beam emitted by the electron gun unit 7 in response to the television signal is accelerated by a high voltage applied to the aluminum foil 6 through the anode electrode 4. The electron beam then impinges on the phosphor 5 provided on the image displaying portion 1*a* of the glass front-panel 1, so as to cause the phosphor 5 to emit light and, thereby, form an image.

As the image is successively displayed in the image displaying portion 1*a*, the glass front-panel becomes charged, and in case of the previously proposed glass front-panel, dielectric breakdown often occurs in the flange portion or in the side wall portion of the front panel due to high electric potential.

According to the present invention, since the electric charge is uniformly cleared by the electrode provided on the side wall portion, no instantaneous discharging takes place. Thus, the side wall portion is protected from dielectric breakdown. Further, since the flange portion is strengthened against a dielectric breakdown, damages such as small flaws are not produced in the surface of the flange portion even if an abnormal discharging occurs between the flange portion and the external terminal 8.

Figure 4A:
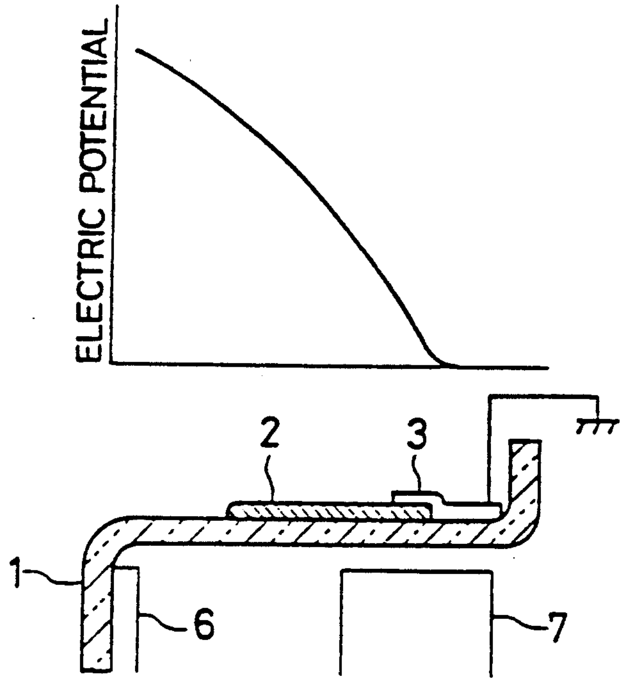
FIG. 4A is a graphical representation of a gradient of electric potential at a time of a belt-like electrode for making the gradient of electric potential easier being applied.
Figure 4B:
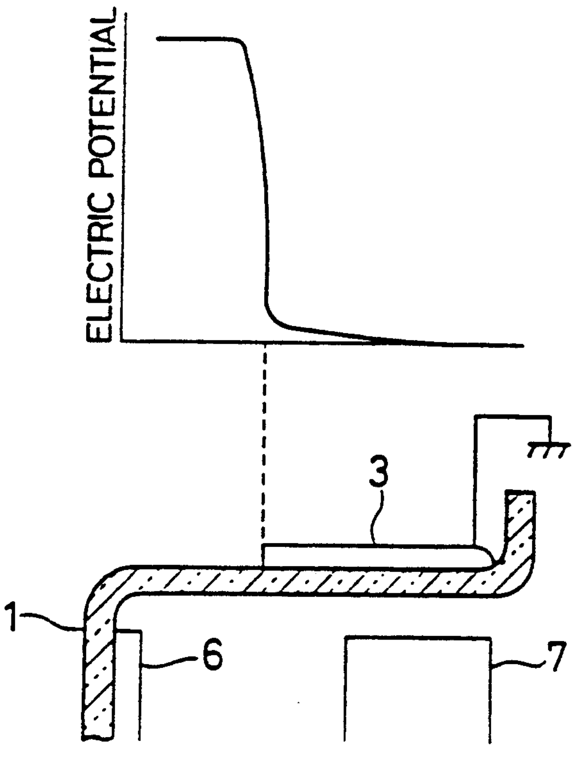
FIG. 4B is a graphical representation of a gradient of electric potential at a time of the electrode appearing :n FIG. 4A being not applied.

Referring to FIGS. 4A and 4B, the function of the electrode 2 for making the gradient of electric potential easier will be described. If the electrode 2 is not provided as shown in FIG. 4B, a gradient of electric potential along the surface of the side wall portion 1*b* of the glass front-panel 1 markedly changes in the vicinity of one end of the conductive electrode 3, when electrons, which is emitted by the electron gun unit 7 and thereafter accelerated, impinge on the aluminum foil 6 of the image displaying portion 1*a*. However, when the electrode 2 is provided as shown in FIG. 4A, the gradient of electric potential along the surface of the side wall portion 1*b* gently changes, so that no creeping discharge occurs.

Figure 5:
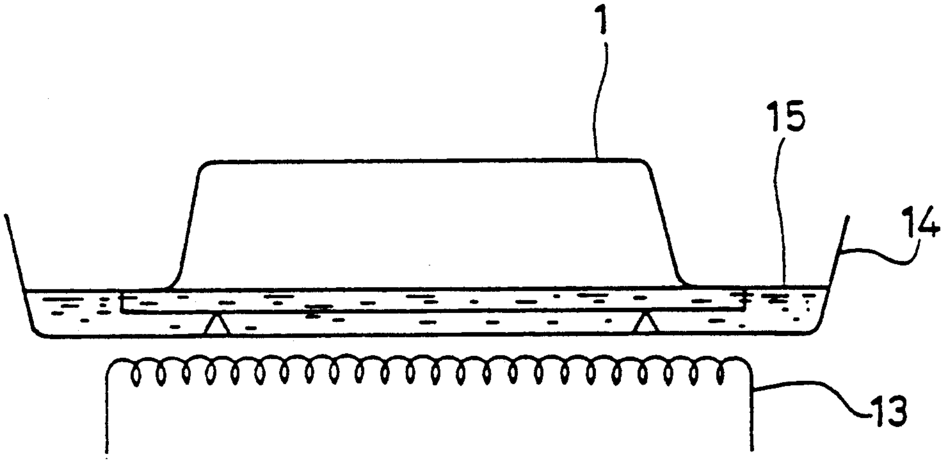
FIG. 5 is an explanatory view of a device for producing the glass front-panel shown in FIG. 1A to 2.

In FIG. 5 illustrating a production method of the glass front-panel of this invention, a solution 15 for etching or eluting is filled into a pan 14 provided with a heater 13, and only the flange portion 1*c* of the glass front-panel 1 is immersed in the solution 15. Thus, only the surface layer of the flange portion 1*c* is substantially removed.

EXAMPLE 1

A glass plate manufactured by a float method being 5 mm thick and of soda-lime-silica contents as shown in the column Glass A of Table 1 was cut into a predetermined shape. The cut surface of the glass plate was ground with a diamond wheel of roughness #400, so that surface roughness $R_{MAX}$ 7.5 μm was obtained. The glass plate was heated and formed by a known press forming method into a glass front-panel 40 mm deep, the image displaying portion thereof being diagonally 25 cm long, and the joining surface of the flange portion thereof being 15 mm wide. Then, the front panel was immersed in a molten salt of potassium nitrate heated to 460° C. for 3 hours and thereafter taken out to be washed in water and dried.

TABLE 1

| | (Percent by weight) | |
|---|---|---|
| Components | Glass A | Glass B |
| $SiO_2$ | 72.79 | 58.80 |
| $Al_2O_3$ | 1.70 | 1.08 |
| MgO | 3.83 | 0.98 |
| CaO | 7.52 | 2.00 |
| $Na_2O$ | 13.38 | 11.02 |
| $K_2O$ | 0.70 | 2.88 |
| BaO | | 9.72 |
| SrO | | 6.74 |
| $Fe_2O_3$ | 0.08 | 0.02 |
| $CeO_2$ | | 0.28 |
| $TiO_2$ | | 0.46 |
| $ZrO_2$ | | 5.74 |
| $CeO_2$ | | 0.28 |
| NiO | | 0.0003 |
| CoO | | 0.0003 |

Then, the flange portion of the glass front-panel provided with resistance to coloring action of an electron beam and an increased mechanical strength was immersed in a 5% water solution of hydrogen fluoride as shown in FIG. 5 to thereby dissolve and remove a thickness of approximately 5 μm from the surface of the glass so that the surface layer containing many potassium ions were removed in substance.

The obtained glass front-panel was stuck to a metal rear-panel with glass frit (tradename "IWF-029B" manufactured by Iwaki Glass Co.) and, thereby, a cathode ray tube as shown in FIG. 3A was fabricated. The cathode ray tube was placed in an atmosphere at 150° C. and a voltage of 10 kV was continuously applied to the image displaying portion for 300 hours, but no crack was initiated in the glass front-panel or the glass frit.

EXAMPLE 2

A glass plate manufactured by a float method being 5 mm thick and of soda-lime-silica contents as shown in the column Glass A of Table 1 was cut into a predetermined shape. The cut surface of the glass plate was ground with a diamond wheel of roughness #400, so that surface roughness $R_{MAX}$ 7.5 μm was obtained. The glass plate was heated and formed by a known press forming method into a glass front-panel 40 mm deep, the image displaying portion thereof being diagonally 25 cm long, and the joining surface of the flange portion thereof being 15 mm wide. Then, the front panel was immersed in a molten salt of potassium nitrate heated to 460° C. for 3 hours and thereafter taken out to be washed in water and dried.

Then, the flange portion of the glass front-panel provided with resistance to coloring action of an electron beam and an increased mechanical strength was immersed in a 30% water solution of sulfuric acid as shown in FIG. 5 to thereby elute sodium ions and potassium ions existing to a depth of approximately 4.5 μm from the surface so that the surface layers containing many alkaline ions were removed in substance.

The obtained glass front-panel was stuck to a metal rear-panel with glass frit (tradename "IWF-029B" manufactured by Iwaki Glass Co.) and, thereby, a cathode ray tube as shown in FIG. 3A was fabricated. The cathode ray tube was placed in an atmosphere at 120° C. and a voltage of 10 kv was continuously applied to the image displaying portion for 500 hours, but no crack was initiated in the glass front-panel or the glass frit.

EXAMPLE 3

A glass plate manufactured by a float method being 5 mm thick and with the contents as shown in the column Glass B of Table 1 was cut into a predetermined shape. The cut surface of the glass plate was ground with a diamond wheel of roughness #400, so that surface roughness $R_{MAX}$ 7.5 μm was obtained. The glass plate was heated and formed by a known press forming method into a glass front-panel 40 mm deep, the image displaying portion thereof being diagonally 25 cm long, and the joining surface of the flange portion thereof being 15 mm wide. Then, the front panel was immersed in a molten salt of potassium nitrate heated to 460° C. for 7 hours and thereafter taken out to be washed in water and dried.

Then, the flange portion of the glass front-panel provided with resistance to coloring action of an electron beam and an increased mechanical strength was immersed in a water solution of the mixed acid containing 5% of hydrogen fluoride and 10% of sulfuric acid as shown in FIG. 5 to thereby dissolve and remove a thickness of approximately 8 μm from the surface so that the surface layers containing many potassium ions were removed in substance.

The obtained glass front-panel was stuck to a metal rear-panel with glass frit (tradename "IWF-029B" manufactured by Iwaki Glass Co.) and, thereby, a cathode ray tube as shown in FIG. 3A was fabricated. The cathode ray tube was placed in an atmosphere at 150° C. and a voltage of 10 kV was continuously applied to the image displaying portion for 300 hours, but no crack was initiated in the glass front-panel or the glass frit.

EXAMPLE 4

A glass plate being 5 mm thick and with the components as shown in the column Glass B of Table 1 was manufactured by a float method. The glass plate was heated and formed by a known press forming method into a glass front-panel 40 mm deep, the image displaying portion thereof being diagonally 25 cm long, and the joining surface of the flange portion thereof being 15 mm wide. Then, in the same manner as that described in Example 1, the front panel was immersed in a molten salt of potassium nitrate heated to 460° C. for 7 hours, and thereafter, the surface layers containing potassium ions were removed.

The obtained glass front-panel was stuck to a metal rear-panel with glass frit (tradename "IWF-029B" manufactured by Iwaki Glass Co.) and, thereby, a cathode ray tube as shown in FIG. 3A was fabricated. The cathode ray tube was placed in an atmosphere at 150° C. and a voltage of 10 kV was continuously applied to the image displaying portion for 300 hours, but no dielectric breakdown phenomenon was observed and no crack was initiated in the glass front-panel or the glass frit.

EXAMPLE 5

A glass plate being 5 mm thick and of soda-lime-silica contents as shown in the column Glass A of Table 1 manufactured by a float method was heated and formed by a known press forming method into a glass front-panel 40 mm deep, the image displaying portion thereof being diagonally 25 cm long, and the joining surface of the flange portion thereof being 15 mm wide. Then, the front panel was immersed in a molten salt of potassium nitrate heated to 460° C. for 3 hours and thereafter taken out to be washed in water and dried.

Then, the flange portion of the glass front-panel provided with resistance to coloring action of an electron beam and an increased mechanical strength was immersed in a 5% water solution of hydrogen fluoride as shown in FIG. 5 to thereby dissolve and remove a thickness of approximately 10 μm from the surface, so that the surface layers containing many potassium ions were removed. The obtained glass front-panel was stuck to a metal rear-panel with glass frit (tradename "IWF-029B" manufactured by Iwaki Glass Co.) and, thereby, a cathode ray tube as shown in FIG. 3A was fabricated. The cathode ray tube was placed in an atmosphere at 150° C. and a voltage of 10 kV was continuously applied to the image displaying portion for 300 hours, but no crack was initiated in the glass front-panel or the glass frit.

EXAMPLE 6

A glass plate being 5 mm thick and of soda-lime-silica contents as shown in the column Glass A of Table 1 manufactured by a float method was heated and formed by a vacuum forming method with a press process, into a glass front-panel 40 mm deep, the image displaying portion thereof being diagonally 25 cm long, and the joining surface of the flange portion thereof being 15 mm wide. Then, the front panel was immersed in a molten salt of potassium nitrate heated to 460° C. for 3 hours and thereafter taken out to be washed in water and dried.

Then, the flange portion of the glass front-panel provided with resistance to coloring action of an electron beam and an increased mechanical strength was immersed in a 5% water solution of hydrogen fluoride as shown in FIG. 5 to thereby dissolve a thickness of approximately 10 μm from the surface of the glass so that the surface layer containing many potassium ions were removed.

Then, a belt-like electrode was formed so as to cover the side wall portion of the obtained glass front-panel by applying a liquid composed of 50% by weight of fine silicon-carbide powder and 50% by weight of alumina sol. The electrode was laid in a band form around the whole side wall portion, from the level approximately 35 mm above the position of the rear panel to the level where the front surface 7*a* of the electron gun unit is projected on the side wall portion. A conductive electrode was laid in a band form near to the flange portion with a width of approximately 13 mm around the whole side wall portion. The conductive electrode covered a part of the former electrode by approximately 3 mm. The carbon electrode was obtained by means of applying a mixture of fine carbon powder and alumina sol. The cathode ray tube shown in FIG. 3B was fabricated by using the above front panel.

The belt-like electrode of carbon was connected with an external ground terminal and the aluminum foil of the image displaying portion was continuously subjected to a bombardment of the electron beam accelerated by a voltage of 10 kV in a thermostatic chamber at approximately 80° C. for 10,000 hours. However, no crack due to abnormal discharging was initiated in any of the side wall portion and flange portion of the front panel and the joint portion.

EXAMPLE 7

A cathode ray tube was fabricated in a similar manner to that described in Example 6, except that a belt-like electrode made of a mixture of fine powder of carbon and fine powder of titan oxide, and having approximately $1\times10^9$ Ω cm of electric resistivity was additionally provided on the inner surface of the side wall portion as shown in FIG. 3C. The cathode ray tube was subjected to a continuous bombardment of the electron beam in the same manner as that described in Example 6 for 10,000 hours. However, no crack due to abnormal discharging was initiated in any of the side wall portion and flange portion of the front panel and the joint portion.

EXAMPLE 8

A glass plate being 5 mm thick and of soda-lime-silica contents as shown in the column Glass A of Table 1 manufactured by a float method was heated and formed by a known press forming method into a glass front-panel 40 mm deep, the image displaying portion thereof being diagonally 25 cm long, and the joining surface of the flange portion thereof being 15 mm wide. Then, the front panel was immersed in a molten salt of potassium nitrate heated to 460° C. for 2 hours and thereby, the surface layer having more potassium ions than those in the interior were obtained. The thus obtained front panel whose flange portion was provided with the above described surface layer was stuck to a metal rear-panel with glass frit (tradename "IWF-029B" manufactured by Iwaki Glass Co.) and, thereby, a cathode ray tube as shown in FIG. 3A was fabricated.

Then, a belt-like electrode was formed so as to cover the side wall portion of the obtained glass front-panel by means of applying a liquid composed of 50% by weight of fine silicon-carbide powder and 50% by weight of alumina sol. The electrode was laid in a band form around the whole side wall portion, from the level approximately 35 mm above the position of the rear panel to the level where the front surface 7*a* of the electron gun unit is projected on the side wall portion. A conductive electrode was laid in a band form near to the flange portion with a width of approximately 13 mm around the whole side wall portion. The conductive electrode covered a part of the former electrode by approximately 3 mm. The carbon electrode was obtained by means of applying a mixture of fine carbon powder and alumina sol. The cathode ray tube shown in FIG. 3B was fabricated by using the above front panel.

The belt-like electrode of carbon was connected with an external ground terminal and the aluminum foil of the image displaying portion was continuously subjected to a bombardment of the electron beam accelerated by a voltage of 10 kV in a thermostatic chamber at approximately 80° C. for 10,000 hours, However, no crack due to abnormal discharging was initiated in any of the side wall portion and flange portion of the front panel and the joint portion.

REFERENCE EXAMPLE 1

A glass plate being 5 mm thick and of soda-lime-silica contents as shown in the column Glass A of Table 1 manufactured by a float method was heated and formed by a known press forming method into a glass front-panel 40 mm deep, the image displaying portion thereof being diagonally 25 cm long, and the joining surface of the flange portion thereof being 15 mm wide. Then, the front panel was immersed in a molten salt of potassium nitrate heated to 460° C. for 2 hours and, thereby, the surface layers having more potassium ions than those in the interior were obtained. The thus obtained front panel whose flange portion was provided with the above described surface layer was stuck to a metal rear-panel with glass frit (tradename "IWF-029B" manufactured by Iwaki Glass Co.) and, thereby, a cathode ray tube as shown in FIG. 3A was fabricated.

When the cathode ray tube was placed in an atmosphere at 150° C. and a voltage of 10 kV was continuously applied to the image displaying portion for 100 hours, a large number of traces of abnormal discharging were observed on the joined surface of the flange portion and a large number of small cracks were produced on the glass frit. Further, lead oxide, a constituent of the frit glass, was observed to have been reduced and acted as the source wherefrom the dielectric breakdown started.

REFERENCE EXAMPLE 2

A glass front-panel was fabricated using a glass plate with the components as shown in the column Glass B of Table 1 in a similar manner to that described in Example 4 and, thereby, a glass front-panel having surface layers containing more potassium ions than those in the interior were formed on the whole glass surface was obtained. Using this front panel, a cathode ray tube as shown in FIG. 3A was fabricated. When the cathode ray tube was placed in an atmosphere at 150° C. and a voltage of 10 kV was continuously applied to the image displaying portion for 100 hours, a large number of traces of abnormal discharging were observed on the joined surface of the flange portion and a large number of small cracks were initiated in the glass frit. Further, lead oxide, a constituent of the frit glass, was observed to have been reduced and acted as the source wherefrom the dielectric breakdown started.

According to the present invention, at least the following effects will be expected.

(1) It does not occur that the image displaying portion of the glass front-panel reduces its luminance and blackens under the influence of coloring action of the electron beam for displaying the image on the image displaying portion, and if electricity charged on the surface of the glass front-panel suddenly discharges, damages to the glass front-panel are not caused, so that a stable image with high luminance is always obtained.

(2) It is possible to manufacture a glass front-panel not expensive, not influenced by the coloring action of the electron beam, and not causing an abnormal discharge, though a glass material, which is composed of soda-lime-silica and able to be massproduced, or which does not contain a large amount of expensive potassium as a raw material, is used. Further, to prevent the abnormal discharge, it is easy to substantially remove the surface layer of the flange portion of the glass front-panel, and after the removal, the surface of the flange portion is very smooth.

What is claimed is:

1. A method of producing a glass front-panel having resistance to coloring action of an electron beam, comprising the steps of:

heating and bending a glass plate to form a glass front-panel having an image displaying portion of a predetermined shape, a side wall portion which is contiguous to said image displaying portion and a flange portion which is contiguous to said side wall portion;

exchanging sodium ions in a whole surface layer of said shaped glass front-panel with potassium ions in a molten salt so as to make said surface layer contain more potassium ions than those in the interior of said shaped glass front-panel and, thereby, make said surface layer resistive to coloring action of the electron beam; and substantially removing only the surface layer of said flange portion by means of immersing said flange portion into an etching liquid containing hydrofluoric acid or into an eluate of alkaline ions containing inorganic acid.

2. A method of producing a glass front-panel having resistance to the coloring action of an electron beam, comprising the steps of:

heating and binding a glass plate to form a glass front-panel having an image displaying portion of a predetermined shape, a side wall portion which is contiguous to said image displaying portion and a flange portion which is contiguous to said side wall portion;

exchanging sodium ions in a whole surface layer of said shaped glass front-panel with potassium ions in a molten salt so as to make said surface layer contain more potassium ions than those in the interior of said shaped glass front-panel and, thereby, make said surface layer resistive to coloring action of the electron beam; and substantially removing only the surface layer of said flange portion by immersing said flange portion into a predetermined substance.

3. A method of producing a glass front-panel according to claim 2 wherein said substance is an etching liquid which contains 5% water solution of hydrogen fluoride.

4. A method of producing a glass front-panel according to claim 2 wherein said substance is an eluate of alkaline ions which contain 30% water solution of sulfuric acid.

5. A method of producing a glass front-panel according to claim 2 wherein said substance contains a molten salt of potassium nitrate.

* * * * *